(12) United States Patent
Binkert

(10) Patent No.: US 10,830,267 B2
(45) Date of Patent: Nov. 10, 2020

(54) DEVICE FOR MOUNTING AN ATTACHMENT PART TO A CARRIER PART

(71) Applicant: A. Raymond et Cie, Grenoble (FR)

(72) Inventor: Sven Binkert, Lörrach (DE)

(73) Assignee: A. Raymond et Cie, Grenoble (FR)

( * ) Notice: Subject to any disclaimer, the term of this patent is extended or adjusted under 35 U.S.C. 154(b) by 410 days.

(21) Appl. No.: 15/578,779

(22) PCT Filed: May 19, 2016

(86) PCT No.: PCT/EP2016/061266
§ 371 (c)(1),
(2) Date: Dec. 1, 2017

(87) PCT Pub. No.: WO2016/193013
PCT Pub. Date: Dec. 8, 2016

(65) Prior Publication Data
US 2018/0135673 A1    May 17, 2018

(30) Foreign Application Priority Data

Jun. 1, 2015    (DE) .................... 10 2015 108 620

(51) Int. Cl.
*F16B 5/02*    (2006.01)
*F16B 37/02*    (2006.01)
*F16B 37/04*    (2006.01)
*F16B 5/06*    (2006.01)

(52) U.S. Cl.
CPC .......... *F16B 5/0635* (2013.01); *F16B 37/02* (2013.01); *F16B 37/043* (2013.01); *Y10T 403/75* (2015.01)

(58) Field of Classification Search
CPC .......... F16B 5/02; F16B 5/0635; F16B 37/02; F16B 37/041; F16B 37/043; F16B 37/044; F16B 39/14; Y10T 403/75
USPC .................... 403/408.1; 411/174, 175, 524
See application file for complete search history.

(56) References Cited

U.S. PATENT DOCUMENTS

| | | | |
|---|---|---|---|
| 2,140,064 | A | 10/1937 | Tinnerman |
| 3,118,480 | A | 1/1964 | Kreider |
| 4,714,392 | A | 12/1987 | Muller et al. |
| 9,267,529 | B2* | 2/2016 | Tejero Salinero .... F16B 37/041 |
| 2003/0147715 | A1 | 8/2003 | Curley, Jr. et al. |
| 2009/0003961 | A1* | 1/2009 | Benkel .................... F16B 37/02 411/190 |

(Continued)

FOREIGN PATENT DOCUMENTS

| | | |
|---|---|---|
| CN | 102308101 A | 1/2012 |
| DE | 3121771 A1 | 12/1982 |
| DE | 102004052332 | 5/2006 |

(Continued)

*Primary Examiner* — Josh Skroupa
(74) *Attorney, Agent, or Firm* — Warner Norcross + Judd LLP

(57) ABSTRACT

A device for mounting an attachment part to a carrier part (1) has two mutually opposite legs (2, 3) and an external head plate (14) which are each arranged at a distance from one another. The head plate (14) and the leg (3) adjacent to the head plate (14) have threaded structures (11, 15), which, through an interaction of a blocking unit (16), having a stop portion (17) and an overlap portion (18), with a holding down means (7) and with the leg (3) bearing a threaded structure (11), are arranged at a fixed distance from one another to form an internal thread.

20 Claims, 3 Drawing Sheets

(56) References Cited

U.S. PATENT DOCUMENTS

2011/0311331 A1    12/2011   Tejero Salinero

FOREIGN PATENT DOCUMENTS

| EP | 0220526  | A1 |   | 10/1986 |            |
|----|----------|----|---|---------|------------|
| EP | 0870938  | A1 |   | 10/1998 |            |
| EP | 2258955  | A2 | * | 12/2010 | F16B 37/044 |
| FR | 2694141  | A1 |   | 1/1994  |            |
| FR | 2722749  | A1 | * | 1/1996  | F16B 37/041 |
| GB | 2099099  |    |   | 12/1982 |            |

* cited by examiner

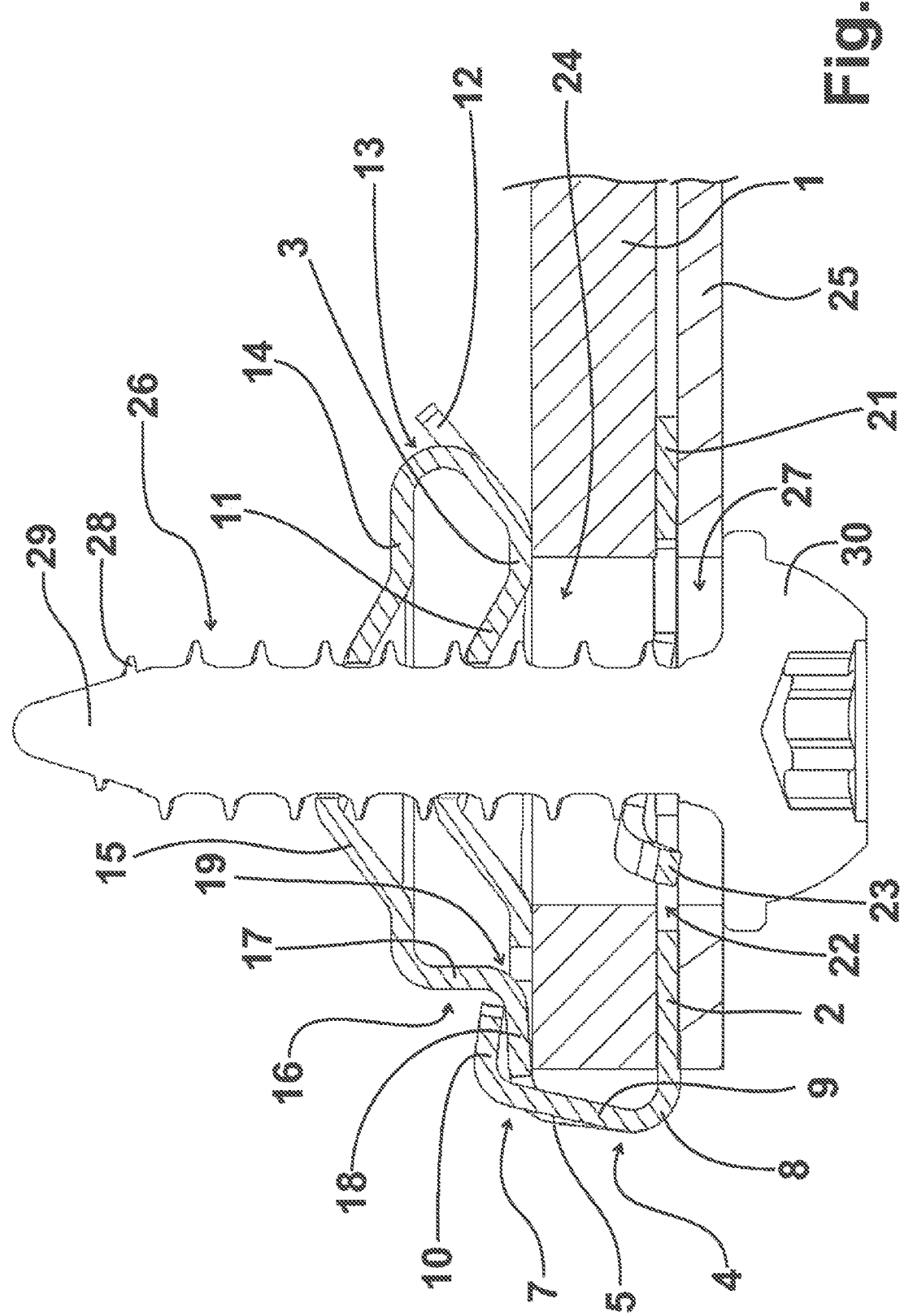

DEVICE FOR MOUNTING AN ATTACHMENT PART TO A CARRIER PART

TECHNICAL FIELD OF THE INVENTION

The invention relates to a device for mounting an attachment part to a carrier part having a first leg as well as a second leg, wherein the legs are connected to one another on the end side by means of a connection portion, having a head plate, which is connected to the second leg by means of a second connection portion opposite to the first connection portion, wherein the head plate is provided with a threaded structure and with a holding-down means to restrict the movement of the end of the head plate opposite to the second connection structure away from the first leg.

BACKGROUND OF THE INVENTION

Such a device is known from US 2011/0311331 A1. Such previously known device for mounting an attachment part to a carrier part has a first leg as well as a second leg. The legs are connected to one other on the end side by means of a connection portion. Further, a head plate provided with a threaded structure is provided, which is connected to the second leg by means of a second connection portion opposite to the first connection portion. In doing so, the head plate is arranged in a cutout of the second leg, which cutout is restricted by two edge arms. An anvil-like configured holding-down means opposite the second connection portion and molded to the first leg, serves to restrict the movement of the end of the head plate opposite to the second connection structure away from the first leg.

BRIEF SUMMARY OF THE INVENTION

The object underlying the invention is to provide a device of the type mentioned at the beginning, which is characterized in being able to be produced and handled simply, having high pull-out resistance of a fastening screw connected to the device.

For a device of the type mentioned at the beginning, such object is solved according to the invention in that a stop structure is provided, which restricts the movement of the head plate in the direction of the second leg.

As a consequence of the movement of the head plate now being restricted by directions both away from the second leg and towards the second leg, the position of the threaded structure is determined comparatively exact, so that the pull-out resistance of a fastening screw or the manageability of false positioning of the threaded structure impairing the device according to the invention are excluded.

For an appropriate further development of the device according to the invention, the second leg bears a further threaded structure opposite the threaded structure of the head plate, wherein the stop structure keeps the threaded structures at a distance from one another, which allows for proper driving of a screw into both threaded structures with standard torque. Such comparatively simple structure results in a fastening screw having an engagement with two threaded structures arranged at a defined distance of one another, resulting in a particularly high pull-out resistance of the fastening screw with a drivability of the fastening screw having comparatively low and defined torque.

For an appropriate further development of the device according to the invention, the stop structure has a stop portion of a blocking unit, which is molded to the head plate, wherein the stop portion extends from the head plate in the direction of the second leg and is opposite the second leg with a front side in at least one abutment region. As a consequence, the interaction of the stop structure and the holding-down means can be very easily calibrated to one another.

For an appropriate configuration of the aforementioned further development, the holding-down means has an L-type holding-down means tongue, and an overlap portion of the blocking unit is molded to its head plate at the stop portion on its side facing away from the head plate, the overlap portion being covered by an end portion of the holding-down means tongue. This results in a particularly simple calibration of the interaction of the stop structure and the holding-down means.

For an appropriate configuration of the aforementioned further development, the first connection portion has two connection arms, which are arranged at a distance from one another and between which the holding-down means tongue is arranged. This results in a highly material-saving and little space-consuming configuration.

For a further appropriate configuration of the device according to the invention, the second connection portion is molded to a feeler tongue of the second leg, which tongue is set facing away from the first leg. In doing so, the distance of the head plate from the second leg can be very easily determined.

BRIEF DESCRIPTION OF THE SEVERAL VIEWS OF THE DRAWINGS

Further appropriate configurations and advantages of the invention follow from the following description of an example embodiment with reference to the figures in the drawing, in which

FIG. 3 shows, in a sectional view, the example embodiment of FIG. 1 with a carrier part and with an attachment part, which is mounted to the carrier part by means of a fastening screw, which is driven into the device according to the invention.

DETAILED DESCRIPTION OF THE INVENTION

Figure 1:
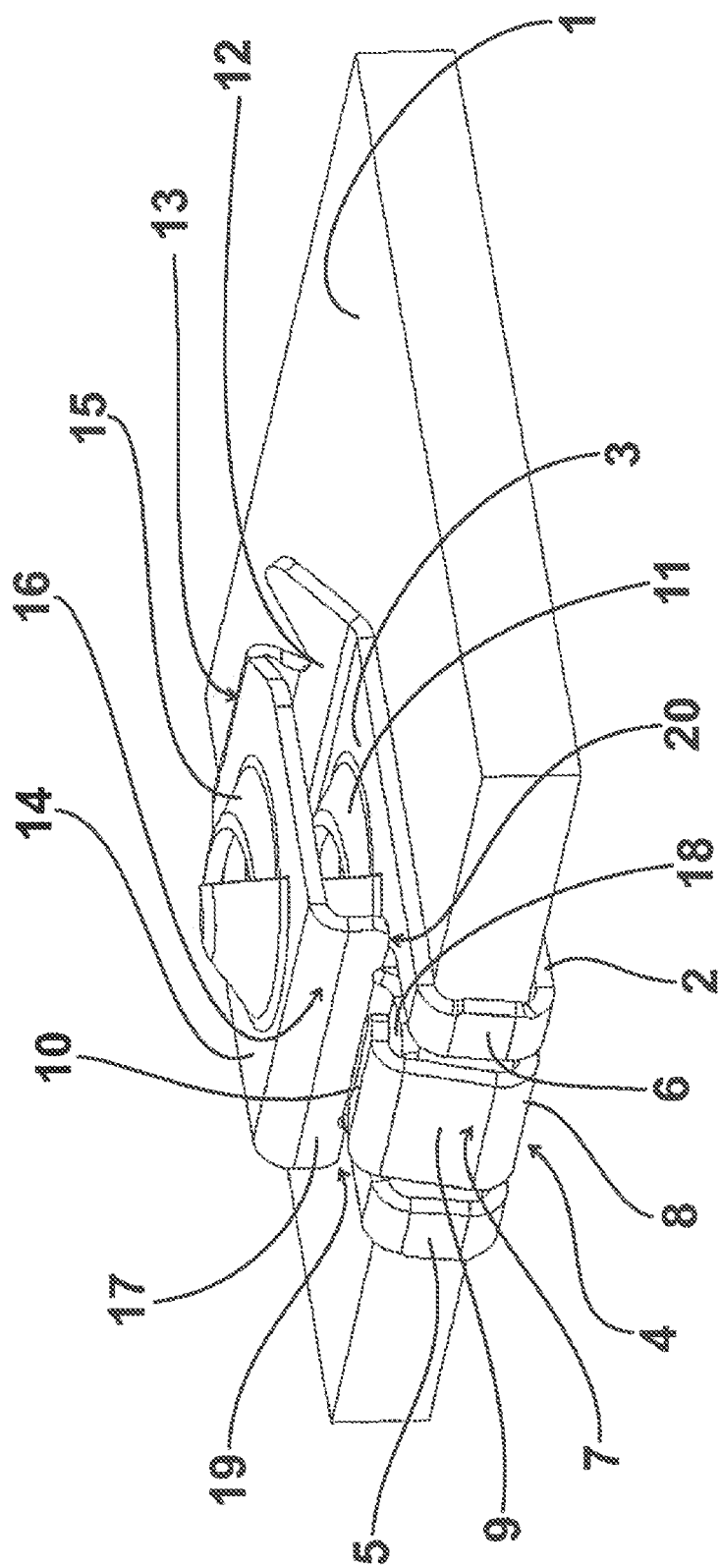
FIG. 1 shows, in perspective view, an example embodiment of a device according to the invention in an arrangement slid onto a carrier part.

FIG. 1 shows, in a perspective view, an example embodiment of a device according to the invention, which is preferably manufactured integrally from sheet metal as a punch and bent part, in an arrangement slid onto a plate-type-configured carrier part 1 on the side of the edge. The example embodiment pursuant to FIG. 1 has, as a first leg, a plate-like configured bottom leg 2, which is arranged on the flat side of carrier part 1 facing away from the observer, in the illustration in FIG. 1. Further, the example embodiment pursuant to FIG. 1 is configured with a likewise plate-like configured cover leg 3 as second leg, which is arranged at a distance opposite to the bottom leg 2, and, in the configuration pursuant to FIG. 1, on the flat side of carrier part 1 facing the observer.

In the illustration pursuant to FIG. 1, the bottom leg 2 and the cover leg 3 are connected with one another at their ends facing the observer by means of a first connection portion 4, which has a first connection arm 5 and a second connection arm 6. The connection arms 5, 6 are arranged essentially orthogonally or slightly angled with respect to the bottom leg 2 as well as the cover leg 3 and at a lateral distance from one another.

At the end of bottom leg 2 facing the observer in the illustration pursuant to FIG. 1, a holding-down means tongue 7 of a holding-down means is molded to the bottom leg 2, which tongue has a connection portion 8 in connection with the bottom leg 2, an interim portion 9, which is arranged between the connection arms 5, 6 in a material-saving way for manufacturing, and an end portion 10, which is facing in the direction of the cover leg 3 and is approximately orthogonal, providing the holding-down means tongue 7 with an L-type shape.

The cover leg 3 has an embossing 11 in terms of an approximately conic-type material projection in its center region, having an edge extending spirally along a thread portion. On the end opposite to the first connection portion 4, the cover leg 3 further bears a feeler tongue 12, which is set angled and facing away from the bottom leg 2.

At the feeler tongue 12, in turn, a head plate 14 is molded in an end portion above a second connection portion 13, which head plate is opposite to the cover leg 3 at a distance and which extends from the second connection portion 13 in the direction of the first connection portion 4. The head plate 14 also bears an embossing 15 in its center region, which is configured according to embossing 11 of the cover leg 3.

Furthermore, a blocking unit 16 is molded to the head plate 14 at its end opposite to the second connection portion 13. The blocking unit 16 has a comparatively broad stop portion 17 as stop structure extending in the direction of cover leg 3, and a smaller overlapping portion 18 opposite the stop portion 17 and positioned in a cutout of the cover leg 3 in the region of the first connection portion 4, which is covered by the end portion 10 of the holding-down means tongue 7.

The edges laterally protruding over the overlap portion 18 of the stop portion 17, abut the cover leg 3 in abutment regions 19, 20, so that the movement of the head plate 14 is restricted to the direction towards the cover leg 3. By means of the overlapping of the overlap portion 18 of the blocking unit 16 by the end portion 10 of the holding-down means tongue 7, the movement of the head plate 14 away from the cover leg 3 is restricted, as well, so that with an expediently zero clearance restriction of the movability of the head plate 14 in these two directions with respect to the cover leg 3, the embossings 11, 15 are arranged at a fixed distance with respect to one another.

Figure 2:
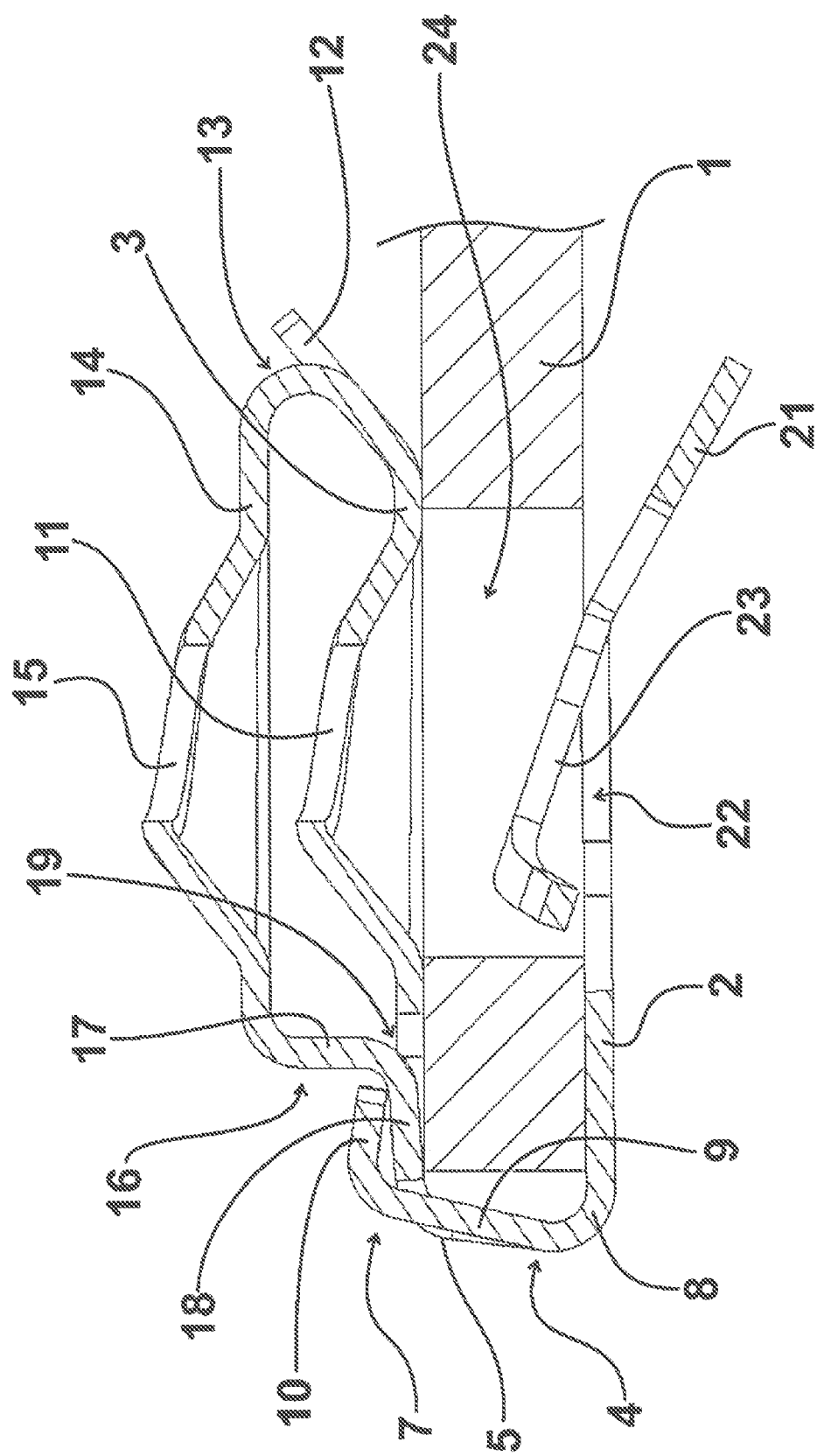
FIG. 2 shows, in a sectional view, the example embodiment of FIG. 1 with the carrier part.

FIG. 2 shows, in a sectional view, the example embodiment pursuant to FIG. 1 having carrier part 1. It can be discerned from FIG. 2, that a feeler tongue 21 is configured at the bottom leg 2 at its averted end with respect to the first connection portion 4, which tongue is set pointing away from the cover leg 3. In doing so, the example embodiment of a device according to the invention pursuant to FIG. 1 can be very simply slid onto a carrier part 1. Furthermore, a prefixing tongue 23 is molded to the bottom leg 2 opposite of the feeler tongue 21 in the region of the bottom leg recess 22, which extends angled in the direction of cover leg 3.

The carrier part 1 is configured with a carrier part recess 24 arranged at an edge distance, into which—with a configuration as intended by the example embodiment pursuant to FIG. 1—the prefixing tongue 23 is inserted and holds the example embodiment pursuant to FIG. 1 reliably at carrier part 1 against an unintended stripping off, together with a certain pretension, which is generated by a slightly oblique-angled arrangement of cover leg 3 in respect to the bottom leg 2 after sliding onto the carrier part 1. The embossings 11,15 are positioned in longitudinal direction in the carrier part recess 23.

Furthermore, it can be derived from the illustration pursuant to FIG. 2, that the end portion 10 of the—expediently tiltable for fine tuning—holding-down means tongue 7—which is slightly tilted in this case abuts the overlap portion 18 of the blocking unit 16 with its edge, and blocks a movement of the head plate 14 away from the cover leg 3, so that the head plate 14 is fixed at a set distance to the cover leg 3, in connection with the interaction of the cover leg 3 and the stop portion 17 in the abutment regions 19, 20.

FIG. 3 shows, in a sectional view, the example embodiment pursuant to FIG. 1 having a carrier part 1 and an attachment part 25, which is mounted to the carrier part 1 by means of a fastening screw 26, which is screwed into the embossings 11, 15 of the explained example embodiment of a device according to the invention, in the fixated configuration of the attachment part 25 at the carrier part 1, the attachment part 25 is configured with an attachment part recess 27, which is arranged in the attachment part 25 in the region of the bottom leg recess 22 on the side facing away from the carrier part 1 of the bottom leg 2.

By means of a screw shaft 29 having a spiral external threading 28, the fastening screw 26 reaches through the attachment part recess 27, the bottom leg recess 22, and the carrier part recess 24 and by means of the external threading 28 is screwed into the embossings 11, 15, which embossings 11, 15 are, with regard to the external threading 28, essentially arranged offset-free within the frame of periodicity of the external threading 28 and thus form internal threading structures.

During driving in of the fastening screw 26, the embossing 15, which is configured at the head plate 14, cannot divert away from the cover leg 3, due to the stop of the overlap portion 18 of the blocking unit 16 at the end portion 10 of the holding-down means tongue 7, even in case of abutting of the screw shaft 29, for example based on an angled position of the fastening screw 26, so that the risk of tilting of the fastening screw 26 during driving in is avoided, as far as possible.

Such engaging of the external threading 28 of the fastening screw 26 having two embossings 11, 15, which form continuous internal threading structures for the external threading 26, results in an essentially unimpeded drivability, having low torque, in the comparatively simply manufacturable embossings 11, 15, one the one hand, which also resist comparatively high starting torque of the fastening screw 26 during application of a screw head 30 of the fastening screw 26 to the side of the attachment part 25, which is averted from the carrier part 1.

The invention claimed is:

1. A device for mounting an attachment part to a carrier part having a first leg as well as a second leg, wherein the legs are connected to one another on the end side by means of a first connection portion, having a head plate, which is connected to the second leg by means of a second connection portion opposite the first connection portion, wherein the head plate is configured with a threaded structure, and having a holding-down means for restricting the movement of the end of the head plate opposite of the second connection structure away from the first leg, characterized in that a stop structure is provided, which restricts the movement of the head plate in the direction towards the second leg.

2. The device according to claim 1, characterized in that the second leg bears a further threaded structure, which is opposite the threaded structure of the head plate, and in that the stop structure holds the threaded structures at a distance from one another, which allows for an appropriate driving of a fastening screw into both threaded structures in the presence of a torque.

3. The device according to claim 2, characterized in that the stop structure has a stop portion of a blocking unit, which is molded to the head plate, wherein the stop portion extends from the head plate in the direction of the second leg and is opposite the second leg with a front side in at least one abutment region.

4. The device according to claim 2, characterized in that the second connection portion is configured at a feeler tongue facing away from the first leg, which tongue is molded to the second leg opposite the first connection portion.

5. The device according to claim 1, characterized in that the stop structure has a stop portion of a blocking unit, which is molded to the head plate, wherein the stop portion extends from the head plate in the direction of the second leg and is opposite the second leg with a front side in at least one abutment region.

6. The device according to claim 5, characterized in that the holding-down means has an L-type holding-down means tongue and in that an overlap portion of the blocking unit is molded to the stop portion on the side facing away from its head plate, which unit is covered by an end portion of the holding-down means tongue.

7. The device according to claim 6, characterized in that the first connection portion has two connection arms, which are arranged at a distance from one another, and between which the holding-down means tongue is arranged.

8. The device according to claim 7, characterized in that the second connection portion is configured at a feeler tongue facing away from the first leg, which tongue is molded to the second leg opposite the first connection portion.

9. The device according to claim 6, characterized in that the second connection portion is configured at a feeler tongue facing away from the first leg, which tongue is molded to the second leg opposite the first connection portion.

10. The device according to claim 5, characterized in that the second connection portion is configured at a feeler tongue facing away from the first leg, which tongue is molded to the second leg opposite the first connection portion.

11. The device according to claim 1, characterized in that the second connection portion is configured at a feeler tongue facing away from the first leg, which tongue is molded to the second leg opposite the first connection portion.

12. A device for mounting an attachment part to a carrier part having a first leg as well as a second leg, wherein the legs are connected to one another on the end side by means of a first connection portion having a head plate which is connected to the second leg by means of a second connection portion opposite a first connection portion, wherein the head plate is configured with a threaded structure, and having a holding-down means for restricting the movement of the end of the head plate opposite of the second connection structure away from the first leg, characterized in that a stop structure is provided, which restricts the movement of the head plate in the direction towards the second leg, the second leg having a further threaded structure that is opposite the threaded structure of the head plate, the stop structure keeping the threaded structure of the second leg and the threaded structure of the head plate spaced apart.

13. The device according to claim 12, characterized in that the stop structure has a stop portion of a blocking unit, which is molded to the head plate, wherein the stop portion extends from the head plate in the direction of the second leg and is opposite the second leg with a front side in at least one abutment region.

14. The device according to claim 13, characterized in that the holding-down means has an L-type holding-down means tongue, and in that an overlap portion of the blocking unit is molded to the stop portion on the side facing away from its head plate, which unit is covered by an end portion of the holding-down means tongue.

15. The device according to claim 14, characterized in that the first connection portion has two connection arms, which are arranged at a distance from one another, and between which the holding-down means tongue is arranged.

16. A device for mounting an attachment part to a carrier part having a first leg as well as a second leg, wherein the legs are connected to one another on the end side by means of a first connection portion having a head plate which is connected to the second leg by means of a second connection portion opposite a first connection portion, wherein the head plate is configured with a threaded structure, and having a holding-down means for restricting the movement of the end of the head plate opposite of the second connection structure away from the first leg, characterized in that a stop structure is provided, which restricts the movement of the head plate in the direction towards the second leg, the stop structure having a stop portion of a blocking unit which is molded to the head plate, wherein the stop portion extends from the head plate in the direction of the second leg.

17. The device according to claim 16, characterized in that the second leg bears a further threaded structure, which is opposite the threaded structure of the head plate, and in that the stop structure holds the threaded structures at a distance from one another, which allows for an appropriate driving of a fastening screw into both threaded structures in the presence of a torque.

18. The device according to claim 17, characterized in that the holding-down means has an L-type holding-down means tongue, and in that an overlap portion of the blocking unit is molded to the stop portion on the side facing away from its head plate, which unit is covered by an end portion of the holding-down means tongue.

19. The device according to claim 18, characterized in that the first connection portion has two connection arms, which are arranged at a distance from one another, and between which the holding-down means tongue is arranged.

20. The device according to claim 19, characterized in that the second connection portion is configured at a feeler tongue facing away from the first leg, which tongue is molded to the second leg opposite the first connection portion.

* * * * *